US006922668B1

(12) United States Patent
Downey (10) Patent No.: US 6,922,668 B1
(45) Date of Patent: Jul. 26, 2005

(54) SPEAKER RECOGNITION

(75) Inventor: Simon N. Downey, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/913,295

(22) PCT Filed: Feb. 25, 2000

(86) PCT No.: PCT/GB00/00660

§ 371 (c)(1),
(2), (4) Date: Aug. 13, 2001

(87) PCT Pub. No.: WO00/54257

PCT Pub. Date: Sep. 14, 2000

(30) Foreign Application Priority Data

Mar. 11, 1999 (GB) .............................................. 9905627
Jul. 2, 1999 (EP) ........................................... 99305278

(51) Int. Cl.[7] .............................................. G10L 17/00
(52) U.S. Cl. ........................ 704/246; 704/248; 704/256
(58) Field of Search ................................. 704/248, 256, 704/241, 246, 250, 232, 234, 254, 255, 239, 240, 243

(56) References Cited

U.S. PATENT DOCUMENTS

| | | | | |
|---|---|---|---|---|
| 4,997,598 A | * | 3/1991 | Aleem-Uddin ............... 261/95 |
| 5,129,002 A | * | 7/1992 | Tsuboka ...................... 704/246 |
| 5,522,012 A | * | 5/1996 | Mammone et al. ......... 704/250 |
| 5,528,728 A | * | 6/1996 | Matsuura et al. ........... 704/232 |
| 5,608,841 A | * | 3/1997 | Tsuboka ...................... 704/256 |
| 5,706,397 A | | 1/1998 | Chow |
| 5,712,956 A | * | 1/1998 | Yamada et al. ............. 704/234 |
| 5,778,341 A | * | 7/1998 | Zeljkovic .................... 704/256 |
| 5,864,810 A | * | 1/1999 | Digalakis et al. ........... 704/255 |
| 5,995,927 A | * | 11/1999 | Li ................................ 704/246 |
| 6,076,055 A | * | 6/2000 | Bossemeyer et al. ....... 704/250 |
| 6,236,964 B1 | * | 5/2001 | Tamura et al. .............. 704/254 |
| 6,389,392 B1 | * | 5/2002 | Pawlewski et al. ......... 704/241 |

FOREIGN PATENT DOCUMENTS

| | | |
|---|---|---|
| EP | 0342630 A2 | 11/1989 |
| EP | 0501631 A2 | 9/1992 |

OTHER PUBLICATIONS

Class et al, "Fast Speaker Adaptation for Speech Recognition Systems", International Conference on Acoustics, Speech & Signal Processing (icassp '90), vol. 1, Apr. 3–6, 1990, pp. 133–136.

Sakoe et al, "Dynamic Programming Algorithm Optimisation for Spoken Word Recognition", IEEE Transactions on Acoustics, Speech, and Signal Processing, vol. 26, No. 1, Feb. 1978.

Rabiner et al, "Speaker–Independent Recognition of Isolated Words Using Clustering Techniques", IEEE Transactions on Acoustics, Speech, and Signal Processing, vol. 27, No. 4, Aug. 1979.

* cited by examiner

*Primary Examiner*—Vijay Chawan
(74) *Attorney, Agent, or Firm*—Nixon & Vanderhye P.C.

(57) ABSTRACT

This invention relates to an improved method and apparatus for speaker recognition. In this invention, prior to comparing feature vectors derived from speech with a stored reference model the feature vectors are processed by applying a speaker dependent transform which matches the characteristics of a particular speaker's vocal tract. Features derived from speech which has very dissimilar characteristics to those of the speaker on which the transform is dependent may be severely distorted by the transform, whereas features from speech which has similar characteristics to those of the speaker on which the transform is dependent will be distorted far less.

22 Claims, 7 Drawing Sheets

$$\begin{bmatrix} 0.7 & 0.3 & 0 & 0 & 0 \\ 0 & 0.8 & 0.2 & 0 & 0 \\ 0 & 0 & 0.65 & 0.35 & 0 \\ 0 & 0 & 0 & 0.9 & 0.1 \\ 0 & 0 & 0 & 0 & 1 \end{bmatrix}$$ transition matrix $$\begin{pmatrix} 0.7 & 0.3 & 0 & 0 & 0 \end{pmatrix}$$ initialisation vector

Figure 10

$$a_{t+1} = \left[ \sum_{i=1}^{6} a_t(i) a_{j4} \right] b_4(O_{t+1})$$

Figure 11

SPEAKER RECOGNITION

FIELD OF THE INVENTION

The present invention relates to speaker recognition. In speaker recognition the identity of the speaker is identified or verified. In speaker identification a speaker is identified either as being one of a group of known speakers, or is rejected as being an unknown speaker. In speaker verification the speaker is either accepted as having a claimed identity or rejected. The speaker may input a claimed identity, for example, by means of a password, a personal identification number or a swipe card.

BACKGROUND OF THE INVENTION

In general, for speaker recognition, speech processing aims to increase the effects on the spoken word of different speakers, whereas for speech recognition, in which a particular word (or, sometimes, a phrase or a phoneme, or other spoken matter), is recognised, speech processing aims to reduce the effects on the spoken word of different speakers.

It is common in to input speech data, typically in digital form, to a front-end processor, which derives from the stream of input speech data more compact, more perceptually significant data referred to as input feature vectors (or sometimes as front-end feature vectors). Where the speaker speaks a predetermined word, known to the recognition apparatus and to the speaker (e.g. a personal identification number in banking) the technique is known as 'text-dependent'. In some applications of speaker recognition a technique is used which does not require the content of the speech to be predetermined, such techniques are known as 'text independent' techniques.

In text-dependent techniques a stored representation of the word, known as a template or model, is previously derived from a speaker known to be genuine. The input feature vectors derived from the speaker to be recognised are compared with the template and a measure of similarity between the two is compared with a threshold for an acceptance decision. Comparison may be done by means of Dynamic Time Warping as described in "On the evaluation of Speech Recognisers and Data Bases using a Reference System", Chollet & Gagnoulet, 1982 IEEE, International Conference on Acoustics, Speech and Signal Processing, pp 2026–2029. Other means of comparison include Hidden Markov Model processing and Neural Networks. These techniques are described in British Telecom Technology Journal, Vol. 6, No. 2 Apr. 1988, "Hidden Markov Models for Automatic Speech Recognition : Theory And Application", SJ Cox pages 105–115, "Multi-layer perceptrons applied to speech technology", McCullogh et al, pages 131–139 and "Neural arrays for speech recognition", Tattershall et al pages 140–163.

Various types of features have been used or proposed for speech processing. In general, since the types of features used for speech recognition are intended to distinguish one word from another without sensitivity to the speaker whereas those for speaker recognition are intended to distinguish between speakers for a known word or words, a type of feature suitable for one type of recognition may be unsuitable for the other. Some types of feature suitable for speaker recognition are described in "Automatic Recognition of Speakers from their voices", Atal, Proc IEEE vol 64 pp 460–475, April 1976.

SUMMARY OF THE INVENTION

According to the present invention there is provided a method of speaker recognition comprising the steps of receiving a speech signal from an unknown speaker; transforming the received speech signal according to a transform, the transform being associated with a particular speaker; comparing the transformed speech signal with a model representing said particular speaker; and providing as an output a parameter which depends upon the likelihood that the unknown speaker is said particular speaker.

Preferably the transforming step comprises the substeps of detecting a speech start point and a speech end point within the received speech signal; generating a sequence of feature vectors derived from the received speech signal; and aligning the sequence of feature vectors corresponding to the speech signal between the detected start point and the detected end point with a representative sequence of feature vectors for said particular speaker such that each feature vector in the aligned sequence of feature vectors corresponds to a feature vector in the representative sequence of feature vectors.

Advantageously the transforming step further comprises the substep of averaging each feature vector in the aligned sequence of feature vectors with the corresponding feature vector in the representative sequence of feature vectors.

Preferably he model is a Hidden Markov Model and may be a left to right Hidden Markov Model.

Advantageously the representative sequence of feature vectors comprises the same number of feature vectors as the number of states in the Hidden Markov Model.

According to another aspect of the present invention there is provided an apparatus for speaker recognition comprising receiving means for receiving a speech signal from an unknown speaker; a speaker transform store for storing a plurality of speaker transforms each transform being associated with a respective one of a plurality of speakers; a speaker model store for storing a plurality of speaker models each speaker model being associated with a respective one of said plurality of speakers; transforming means coupled to the receiving means and the speaker transform store, and arranged in operation to transform the received speech signal according to a selected speaker transform; comparing means coupled to the transforming means and the speaker model store, and arranged in operation to compare the transformed speech signal with the corresponding speaker model; and output means for providing a signal indicative of the likelihood that the unknown speaker is the speaker associated with the selected speaker transform.

Preferably the transform store stores each of said transforms as a representative sequence of feature vectors; and the transforming means comprises a start point and end point detector for detecting a speech start point and a speech end point within the received speech signal, a feature vector generator for generating a sequence of feature vectors derived from the input speech, and aligning means for aligning the sequence of feature vectors corresponding to the speech signal between the detected start point and the detected end point with a representative sequence of feature vectors such that each feature vector in the resulting aligned sequence of feature vectors corresponds to a feature vector in the representative sequence of feature vectors.

Advantageously the transforming means further comprises averaging means for averaging each feature vector in the aligned sequence of feature vectors with the corresponding feature vector in the representative sequence of feature vectors. Preferably the speaker model store is arranged to store the speaker model in the form of a Hidden Markov Model and may be arranged to store the speaker model in the form of a left to right Hidden Markov Model.

Advantageously the stored representative sequence of feature vectors comprises the same number of vectors as the number of states in the corresponding stored Hidden Markov Model.

It is well known that a speaker's vocal tract during speech production may be modelled as a time varying filter. In this invention, prior to comparing feature vectors derived from speech with a stored reference model the feature vectors are processed by applying a speaker dependent transform which matches the. characteristics of a particular speaker's vocal tract. Features derived from speech which has very dissimilar characteristics to those of the speaker on which the transform is dependent may be severely distorted by the transform, whereas features from speech which has similar characteristics to those of the speaker on which the transform is dependent will be distorted far less. Such a speaker dependent transform may be viewed as a similar process to that of conventional matched filtering in which a signal filtered using a matched filter suffers no distortion. Features which have been transformed in this way thus provide more discrimination between speakers. Such transformed features are then used in a conventional speaker recognition comparison process.

BRIEF DESCRIPTION OF THE DRAWINGS

The invention will now be described by way of example only, with reference to the drawings, in which.

DETAILED DESCRIPTION OF THE INVENTION

Figure 1:
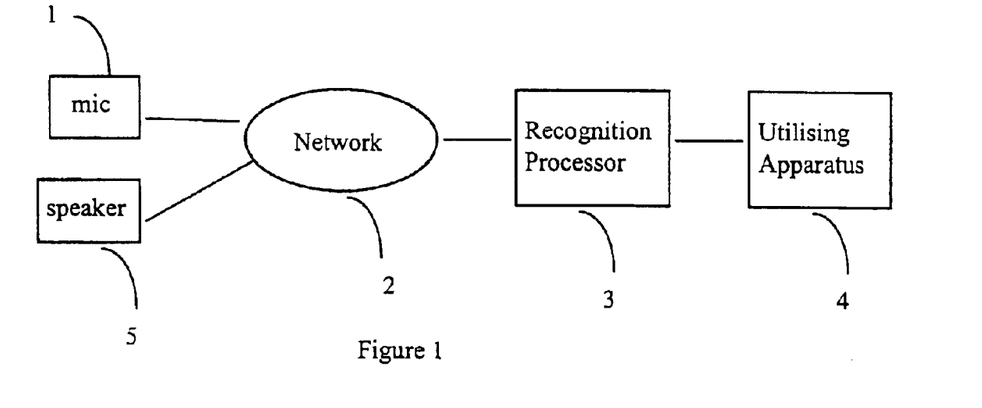
FIG. 1 shows a telecommunications system incorporating a recognition processor.

In FIG. 1 there is shown a telecommunications system including speaker recognition apparatus comprising a microphone, 1, typically forming part of a telephone handset, a telecommunications network 2 (for example a public switched telecommunications network (PSTN) or a digital telecommunications network), a recognition processor 3 connected to receive a voice signal from the network 2, and a utilising apparatus 4 connected to the recognition processor 3 and arranged to receive therefrom a voice recognition signal, indicating recognition or otherwise of a particular speaker, and to take action in response thereto. For example, the utilising apparatus 4 may be a remotely operated banking terminal for effecting banking transactions. In many cases, the utilising apparatus 4 will generate an audible response to a user, transmitted via the network 2 to a loudspeaker 5 typically forming a part of the telephone handset.

In operation, a speaker speaks into the microphone 1 and an analogue speech signal is transmitted from the microphone 1 into the network 2 to the recognition processor 3, where the speech signal is analysed and a signal indicating recognition or otherwise of a particular speaker is generated and transmitted to the utilising apparatus 4, which then takes appropriate action in the event of recognition or otherwise of a particular speaker. If the recognition processor is performing speaker identification then the signal indicates either the identified speaker or that the speaker has been rejected. If the recognition processor is performing speaker verification the signal indicates that the speaker is or is not the claimed speaker.

The recognition processor needs to acquire data concerning the identity of speakers against which to compare the speech signal. This data acquisition may be performed by the recognition processor in a second mode of operation in which the recognition processor 3 is not connected to the utilising apparatus 4, but receives a speech signal from the microphone 1 to form the recognition data for that speaker. However, other methods of acquiring the speaker recognition data are also possible; for example, speaker recognition data may be held on a card carried by the speaker and insertable into a card reader, from which the data is read and transmitted through the network to the recognition processor prior to transmission of the speech signal.

Typically, the recognition processor 3 is ignorant of the route taken by the signal from the microphone 1 to and through the network 2; the microphone 1 may, for instance be connected through a mobile analogue or digital radio link to the network 2, or may originate from another country. The microphone may be part of one of a wide variety of types and qualities of receiver handset. Likewise, within the network 2, any one of a large variety of transmission paths may be taken, including radio links, analogue and digital paths and so on.

Figure 2:
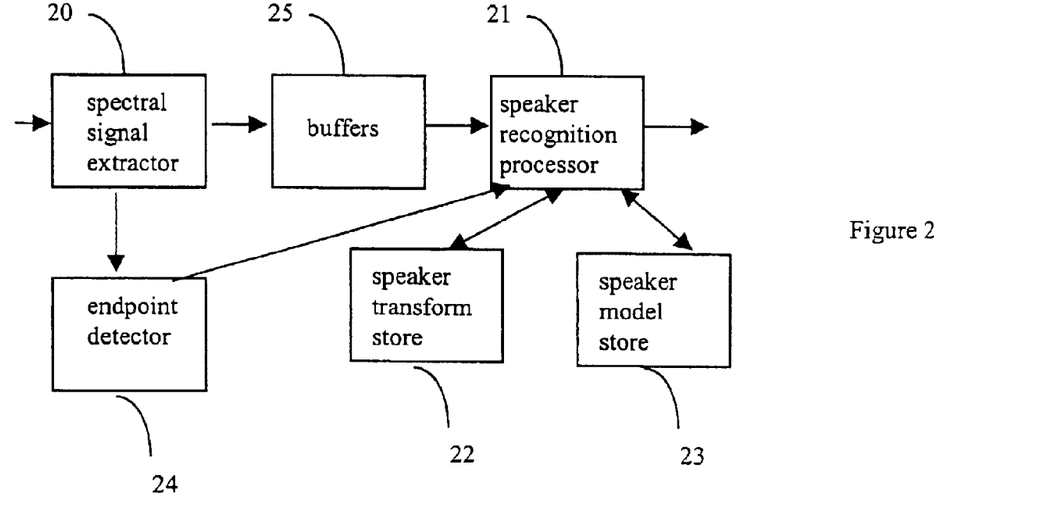
FIG. 2 shows part of the recognition processor of FIG. 1 incorporating a spectral signal extractor.

FIG. 2 shows part of the recognition processor 3. Digital speech is received by a spectral signal extractor 20, for example, from a digital telephone network, or from an analogue to digital converter. A number of feature vectors, each of which represents a number of contiguous digital samples, are derived from the digital speech. For example, speech samples may be received at a sampling rate of 8 kHz, and a feature vector may represent a frame of 256 contiguous samples, i.e. 32 ms of speech.

The spectral signal extractor 20 provides feature vectors to an endpoint detector 24 which provides as outputs signals indicating the startpoint and endpoint of the received speech. The feature vectors are also stored in frame buffers 25 prior to processing by a speaker recognition processor 21.

The start and endpoints of speech are be provided using a conventional energy based endpointer. In an improved technique signals from a speech recogniser configured to recognise the specific word may be used.

A plurality of feature vectors are received by the speaker recognition processor 21, which reads a speaker dependent transform matrix associated with a particular speaker from a speaker transform store 22 and a reference model associated with the particular speaker from a speaker model store 23. The speaker recognition processor then processes the received feature vectors in dependence upon the retrieved speaker transform matrix and model and generates an output signal in dependence upon the likelihood that the speaker represented by retrieved model and speaker dependent transform produced the speech represented by the received feature vectors. The operation of the speaker recognition processor will be described more fully later with reference to FIG. 4a and FIG. 4b. The speaker recognition processor 21 constitutes the transforming means the comparing means and the output means of the present invention.

Figure 3:
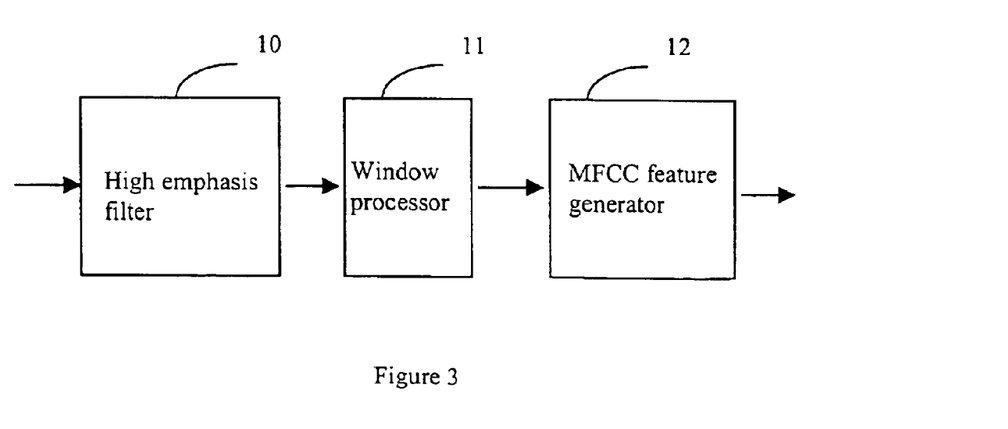
FIG. 3 shows the spectral signal extractor of FIG. 2.

Referring now to FIG. 3, the operation of the spectral signal extractor 20 will now be described in more detail. A high emphasis filter 10 receives the digitised speech waveform at, for example, a sampling rate of 8 kHz as a sequence of 8-bit numbers and performs a high emphasis filtering process (for example by executing a $1-0.95.z^{-1}$ filter), to increase the amplitude of higher frequencies.

A frame of contiguous samples of the filtered signal is windowed by a window processor 11 (i.e. the samples are multiplied by predetermined weighting constants) using, for example, a Hamming window, to reduce spurious artefacts generated by the frame's edges. In a preferred embodiment the frames are overlapping for example by 50%, so as to provide, in this example one frame every 16 ms.

Each frame of 256 windowed samples is then processed by a Mel Frequency Cepstral Coefficient (MFCC) generator 12 to extract an MFCC feature vector comprising a set of MFCC's (for example 8 coefficients).

The MFCC feature vector is derived by performing a spectral transform e.g. a Fast Fourier Transform (FFT), on each frame of a speech signal, to derive a signal spectrum; integrating the terms of the spectrum into a series of broad bands, which are distributed in a 'mel-frequency' scale along the frequency axis; taking the logarithms of the magnitude in each band; and then performing a further transform (e.g. a Discrete Cosine Transform (DCT)) to generate the MFCC coefficient set for the frame. It is found that the useful information is generally confined to the lower order coefficients. The mel-frequency scale is frequency bands evenly spaced on a linear frequency scale between 0 and 1 kHz, and evenly spaced on a logarithmic frequency scale above 1 kHz.

The high emphasis filter 10, window processor 11, MFCC generator 12, end point detector 24, and speaker recognition processor 21 may be provided by one or more suitably programmed digital signal processor (DSP) devices and/or microprocessors. The frame buffers 25, speaker transform store 22 and speaker model store 23 may be provided within read/write memory devices connected to such processor devices.

Figure 4A:
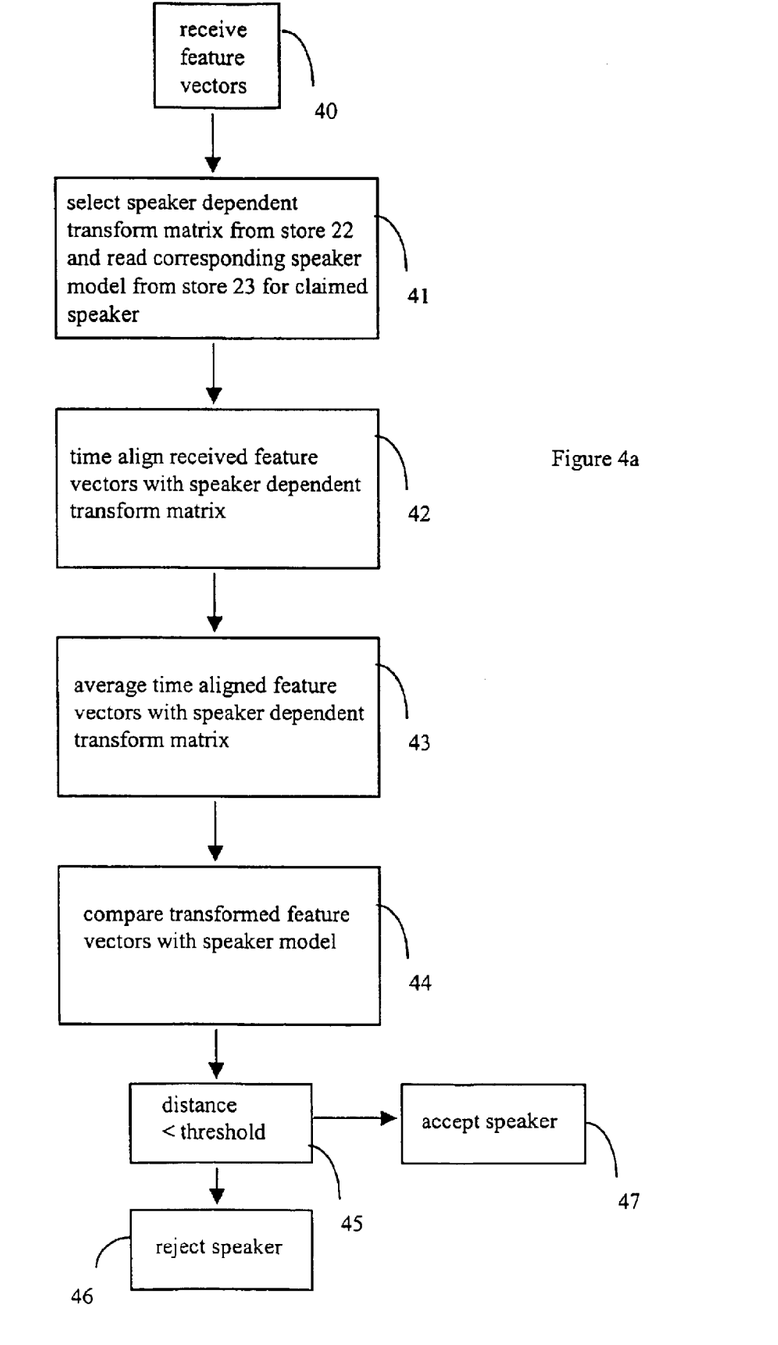
FIG. 4a is a flow diagram showing the operation of the recognition processor of FIG. 1 during speaker verification.

FIG. 4a indicates schematically the operation of the speaker recognition processor 21 during speaker verification. The speaker recognition processor receives a sequence of feature vectors at step 40 and a detected start point and a detected end point from the endpoint detector 11. At step 41 the speaker recognition processor selects a speaker dependent transform matrix from the speaker transform store 22 for the speaker a user is claiming to be and reads a corresponding model which represents the same speaker as the representative feature matrix from the speaker model store 23.

The speaker dependent transform matrix represents a particular word for a particular speaker. It comprises a representative sequence of feature vectors of the represented word when uttered by the represented speaker. The speaker dependent transform matrix is also referred to herein as the sequence of representative feature vectors. The received sequence of feature vectors corresponding to the speech signal between the detected start point and the detected end point is time aligned with the speaker dependent transform matrix using the dynamic time warp (DTW) process at step 42.

The time alignment performed at step 42 will now be described in more detail with reference to FIGS. 5, 6 and 7.

The speaker dependent transform matrix comprises a representative sequence of feature vectors for a particular word.

$$M\ m_1, m_2, \ldots m_i, \ldots m_I$$

A sequence of feature vectors $$R\ r_1, r_2, \ldots r_j \ldots r_J$$

is received The received sequence of feature vectors is time aligned with the representative sequence of feature vectors as follows.

Figure 5:
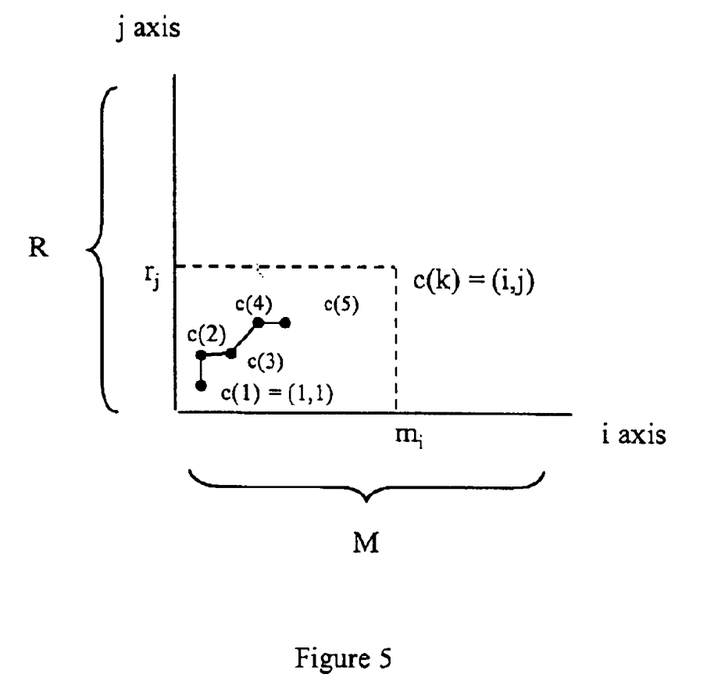
FIG. 5 shows an example of a warping function between two feature vectors M and R.

Referring to FIG. 5 the representative sequence is represented along the i-axis and the received sequence is represented along the j-axis.

The sequence of points $C=(i, j)$ represents a "warping" function F which approximately realises a mapping from the time axis of the received sequence of feature vectors onto that of the representative sequence of feature vectors.

$$F\ c(1), c(2), \ldots, c(k), \ldots c(K)\ \text{where}\ c(k)=(r(k),m(k))$$

Figure 6:
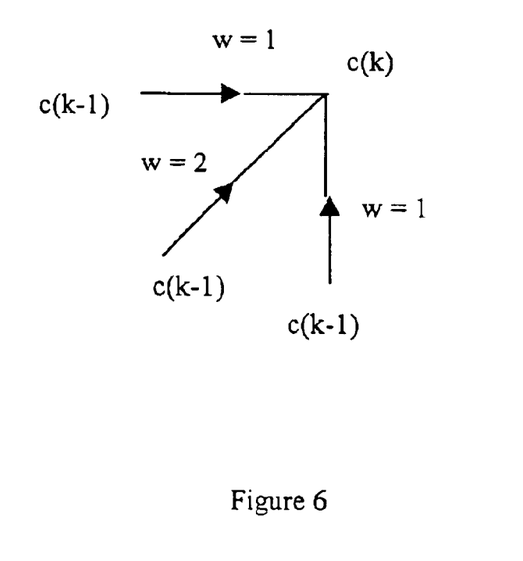
FIG. 6 shows an example of a weighting function which may be applied during warping.

As a measure of the difference between two feature vectors M and R a distance $d(c)\ d(i,j)\ \|m_i\ r_j\|$ is used. The summation of the distances on the warping function is $$\sum_{k=1}^{K} d(c(k))$$

which gives measure of how well the warping function F maps one set of feature vectors onto another. This measure reaches a minimum value when F is determined to optimally adjust timing differences between the two sequences of feature vectors. Alternatively a weighting function may be employed so that a weighted summation is used.

$$\sum_{k=1}^{K} d(c(k)) \cdot Z(k)$$

and $Z(k)$ is used to weight the distance measures. One example of a weighting function is:

$$Z(K)\ (i(K)\ i(K\ 1))\ (j(K)\ j(K\ 1))$$

which is shown diagrammatically in FIG. 6

The time normalised distance between two sequences of vectors is defined as $$D(M,R) \stackrel{Min}{F} \left\{ \begin{array}{l} \leftrightarrow \\ \leftrightarrow \\ \leftrightarrow \\ \leftrightarrow \\ \leftarrow \end{array} \right. \begin{array}{l} \sum_{k=1}^{K} d(c(k)) \cdot Z(k) \\ \rule{3cm}{0.4pt} \\ \sum_{k=1}^{K} Z(k) \\ \ldots \end{array} \begin{array}{l} \approx \\ \approx \\ \approx \\ \approx \end{array}$$

Various restrictions can be imposed on the warping function F as described in "Dynamic Programming Algorithm Optimisation for Spoken Word Recognitions", Sakoe and Chiba, IEEE Transactions on Acoustics Speech and Signal Processing, vol, 26, No. 1, February 1978. The equations for calculating the time normalised distance together with the warping function F which provides the minimum value required are as follows:

$$g_1(c(1)) = d(c(1) \cdot Z(1))$$

$$g_k(c(k)) = \min_{c(k-1)} \left[ g_{k-1}(c(k-1)) + d(c(k)) \cdot Z(k) \right]$$

which is known as the "dynamic programming" equation the time normalised distance is $$D(M,R) = \frac{1}{\sum_{k=1}^{K} Z(k)} g_K(c(k)).$$

If the weighting function shown earlier is used then the dynamic programming (DP) equation becomes $$g(i,j) = \min \begin{cases} g(i,j-1) + d(i,j) \\ g(i-1,j-1) + 2d(i,j) \\ g(i-1,j) + d(i,j) \end{cases} \approx \sum_{k=1}^{K} Z(k) = I + J$$

Figure 7:
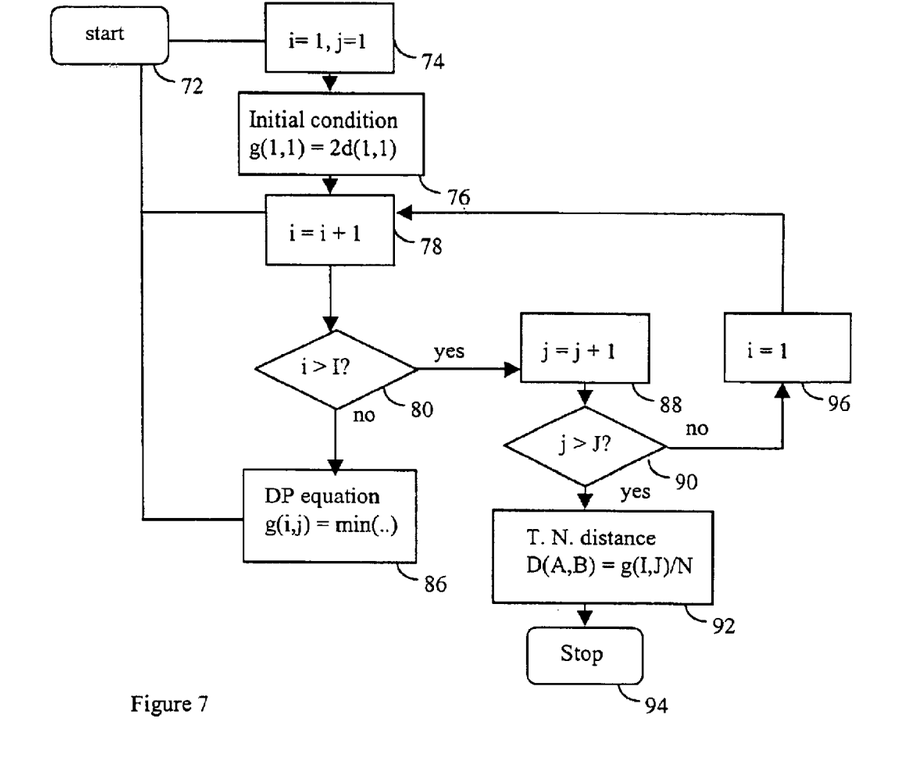
FIG. 7 is a flow diagram showing calculation of time normalised distance between two feature vectors.

A flow chart showing the calculation of the time normalised distance using the weight function of FIG. 6 is shown in FIG. 7.

At step 74 i and j are initialised to be equal to 1. At step 76 the initial value of g(1,1) is set to be equal to $m_1 - r_1$ (d(1,1)) multiplied by 2 (according to the weighting function w). Then i is increased by 1 at step 78 and unless i is greater than I at step 80 the dynamic programming equation is calculated at step 86. If i is greater than I then j is incremented at step 88 and i reset to 1 at step 96. Steps 78 and 86 are then repeated until eventually the dynamic programming equation has been calculated for all values of I and J, then the time normalised distance is calculated at step 92.

In a more efficient algorithm the dynamic programming equation is only calculated for values within a restricting window of size r such that $$j - r \leq i \leq j + r$$

The warping function F may then be determined by "backtracking" as follows:

$$C(K) = (I, J)$$

$$C(k-1) = i,j, \text{ for which } \begin{cases} g(i,j-1) \\ g(i-1,j-1) \\ g(i-1,j) \end{cases} \text{ is a minimum}$$

Once the warping function F $$C(1), C(2), C(3), \ldots C(k) \ldots C(K)$$

is known, where $C(k) = (r(k), m(k))$ then it is possible to determine a sequence of "time aligned" received feature vectors $$Z = Z_1, Z_2, \ldots, Z_I$$

In the example shown in FIG. 5
C(1) = (1,1)
C(2) = (1,2)
C(3) = (2,2)
C(4) = (3,3)
C(5) = (4,3)

i.e. $r_1$ is mapped to $m_1$, $r_1$ is mapped to $m_2$, $r_2$ is mapped to $m_2$, $r_3$ is mapped to m3 etc.

It can be seen that both $r_1$ and $r_2$ have been mapped onto $m_2$ and a decision has to be made as to which received feature vector should be used for the time aligned feature vector in this case. An alternative to choosing one of the received feature vectors is to calculate an average of received feature vectors which map onto a single representative feature vector.

If the first such received feature vector is used, then $Z_p = r_q$ $$q = \min_{j(k)} i(k) = p$$

or if the last such received feature vector is used then $Z_p = r_s$ $$s = \max_{j(k)} i(k) = p$$

or if an average is used $$Z_p = \text{Ave } (r_{j(k)}) \; i(k) = p$$

So, in the example of FIG. 5, assuming the first such received vector is used
$Z_1 = r_1$
$Z_2 = r_2$
$Z_3 = r_3$
$Z_4 = r_4$
etc.

It will be appreciated that such an alignment process results in an aligned sequence of feature vectors for which each feature vector in the aligned sequence of feature vectors corresponds to a feature vector in the representative sequence of feature vectors.

Referring again to FIG. 4a, in an improved version of the transforming process, each of the time aligned received feature vectors is also averaged with the corresponding feature vector of the speaker dependent transform matrix at the optional step 43. If the time aligned received feature vectors are substantially different from the corresponding feature vectors of the speaker dependent transform matrix then such an averaging step will severely distort the time aligned received feature vectors, whereas if the time aligned received feature vectors are similar to the speaker dependent transform matrix then the averaging process will distort the received feature matrix very little. Such transformed features should increase the discrimination in any subsequent comparison process.

The transformed features are then used in a conventional speaker recognition comparison process at step 44. In this embodiment of the invention the speaker model is provided by a left to right Hidden Markov Model, and the comparison is performed using the Viterbi algorithm as will be described shortly with reference to FIGS. 8 to 11. A distance measure indicating the likelihood that the represented speaker produced the speech represented by the received feature vectors is generated and is subsequently compared with a threshold at step 45. If the difference is less than the threshold, the speaker is accepted as corresponding to the stored template at step 47; otherwise the speaker is rejected at step 46.

The principles of modelling speech using Hidden Markov Models and Viterbi recognition will now be described with reference to FIGS. 8 to 11.

Figure 8:
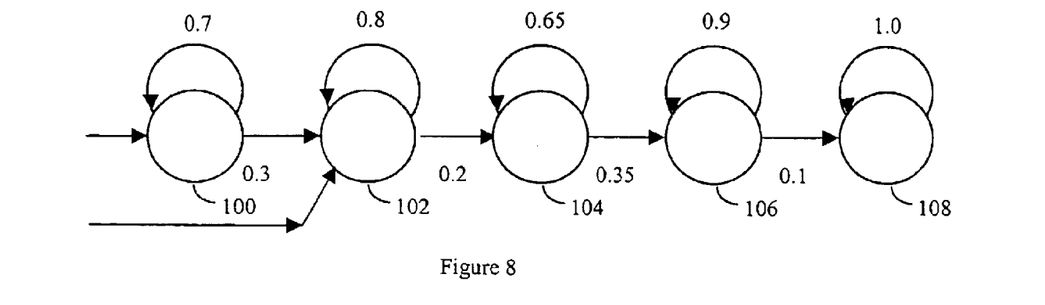
FIG. 8 is an example of a Markov Model.

FIG. 8 shows an example HMM. The five circles 100, 102, 104, 106 and 108 represent the states of the HMM and, at a discrete time instant t the model is considered to be in one of the states and is considered to emit an observation $O_t$. In speech or speaker recognition each observation generally corresponds to a feature vector.

Figure 9:
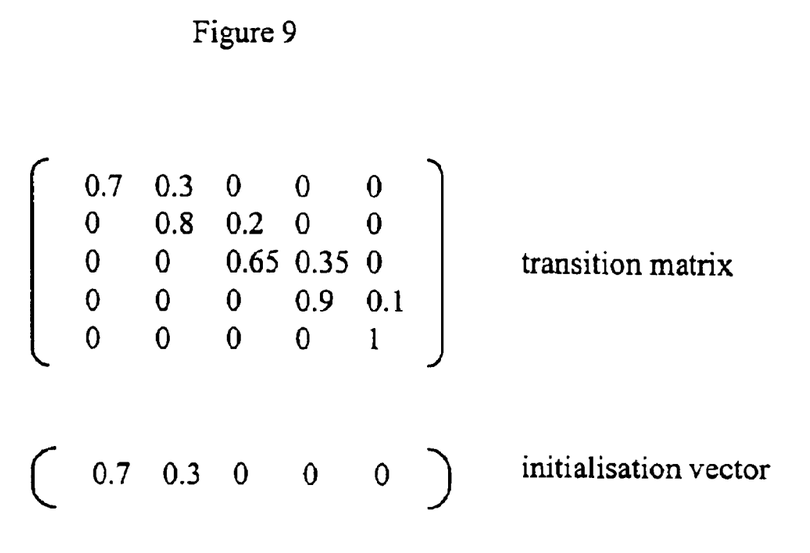
FIG. 9 shows the transition matrix and an example of an initialisation vector for the Markov Model of FIG. 8.

At instant t+1, the model either moves to a new state or stays in the same state and in either case emits another observation and so on. The observation emitted depends only on the current state of the model. The state occupied at time t+1 depends only on the state occupied at time t (this property is known as the Markov property). The probabilities of moving from one state to another may be tabulated in an N×N state transition matrix $(A=[a_{i,j}])$ as shown in FIG. 9. The entry in the $i^{th}$ row and the $j^{th}$ column of the matrix is the probability of moving from state $s_i$ at time t to state $s_j$ at time t+1. As the probability of moving from a state is 1.0 (if the model stays in the same state then this is considered to be a transition to itself), each row of the matrix sums to 1.0. In the example shown the state transition matrix only has entries in the upper triangle because this example is a left to right model in which no "backwards" transitions are allowed. In a more general HMM transitions may be made from any state to any other state. Also shown is an initialisation vector $(\Sigma)$ whose $i^{th}$ component is the probability of occupying state $S_i$ at time t=1.

Assuming that W such models exist $M_1 \ldots M_W$, each representing a particular speaker and that a speech signal from an unknown speaker is represented by a sequence of T observations $O_1, O_2, O_3 \ldots O_T$, the problem is then to determine which model is most likely to have emitted this sequence of observations, i.e. to determine k where $$P_k \max_{i\ 1,2,3,\ldots,W} Pr(O|M_i).$$

Pr(O|M) is calculated recursively as follows:

The forward probability $\Delta_t(j)$ is defined to be the probability of a model emitting the partial observation sequence $O_1, O_2, \ldots O_t$ and occupying state $S_j$ at time t.

Therefore, $Pr(O|M) \overset{N}{\underset{j\ 1}{f}} \Delta_T(j)$

Figure 10:
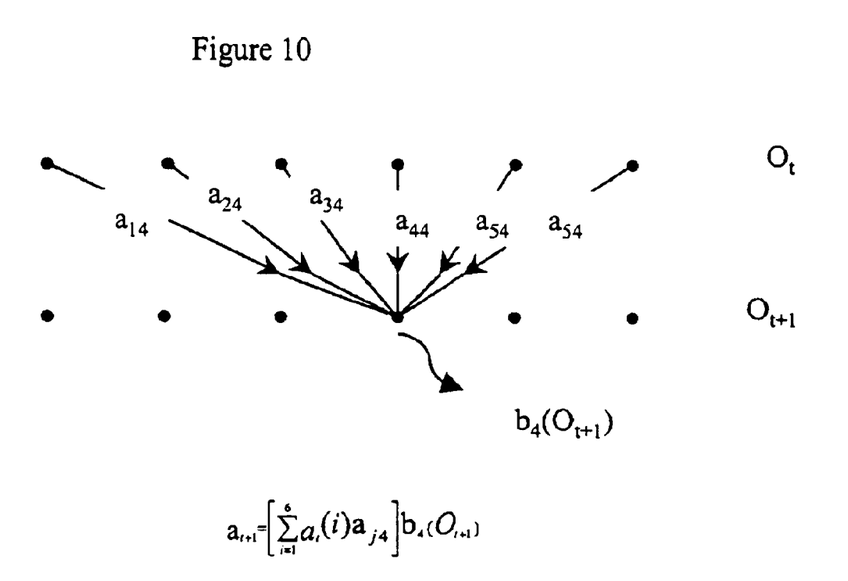
FIG. 10 illustrates the computation of forward probabilities for a six state Hidden Markov Model.

The probability of the model occupying state $S_j$ at time t+1 and emitting observation $O_{t+1}$ may be calculated from the forward probabilities at time t, the state transition probabilities $(a_{i,j})$ and the probability $b_j(O_{t+1})$ that state $S_j$ emits the observation $O_{t+1}$ as follows:

$$\Delta_{t\ 1}(j) \overset{N}{\underset{j\ 1}{f}} \Delta_t(i) a_{i,j} \cdot b_j(O_{t\ 1})$$

FIG. 10 illustrates the computation of $\Delta_{t+1}(4)$ for a six state HMM.

The recursion is initialised by setting $\Delta_t(j) = \Sigma(j) b_j(O_1)$.

Figure 11:
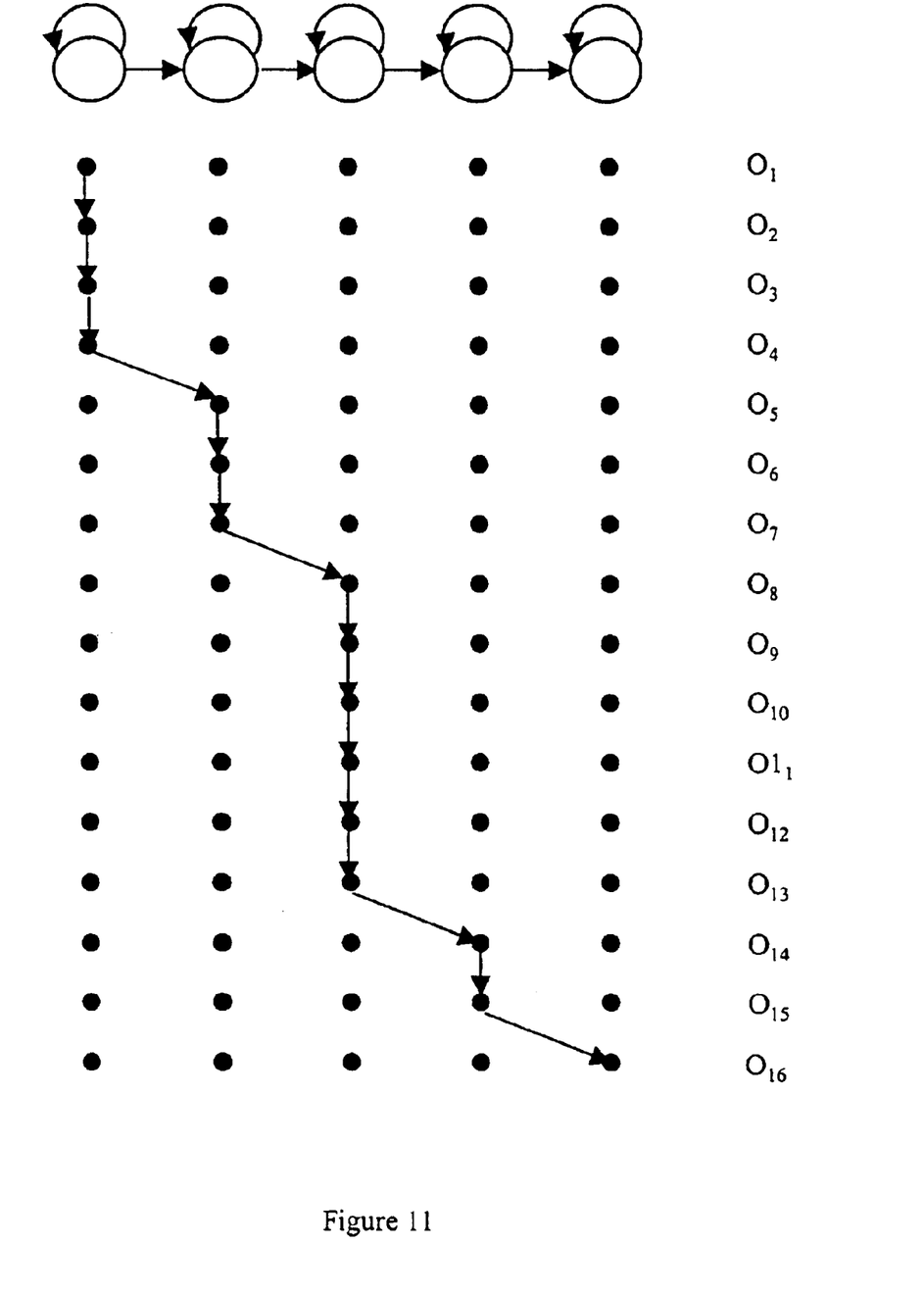
FIG. 11 illustrates a possible state sequence calculated using the Viterbi algorithm.

A computationally more efficient variant of the above algorithm is known as the Viterbi algorithm. In the Viterbi algorithm instead of summing the forward probabilities as described, the maximum of the forward probabilities is used.

i.e. $I_{t\ 1}(j) \overset{Max}{\underset{1,2,\ldots,N}{}} I_t(i) a_{i,j} \cdot b_j(O_{t\ 1})$ If it is required to recover the most likely state sequence then each time $I_t$ is calculated $\therefore_t(j)$ is recorded, where $\therefore_t(j)$ is the most likely state at time t−1 given state $s_j$ at time t i. e. the state which maximises the right hand side of the above equation. The most likely state at time T is that state $s_k$ for which $I_T(j)$ is a maximum and $\therefore_T(k)$ gives the most likely state at time T−1 and so on.

FIG. 11 illustrates a possible state sequence calculated using the Viterbi algorithm for an observation (or feature vector) sequence of sixteen frames and a five state left to right Hidden Markov Model.

Figure 4B:
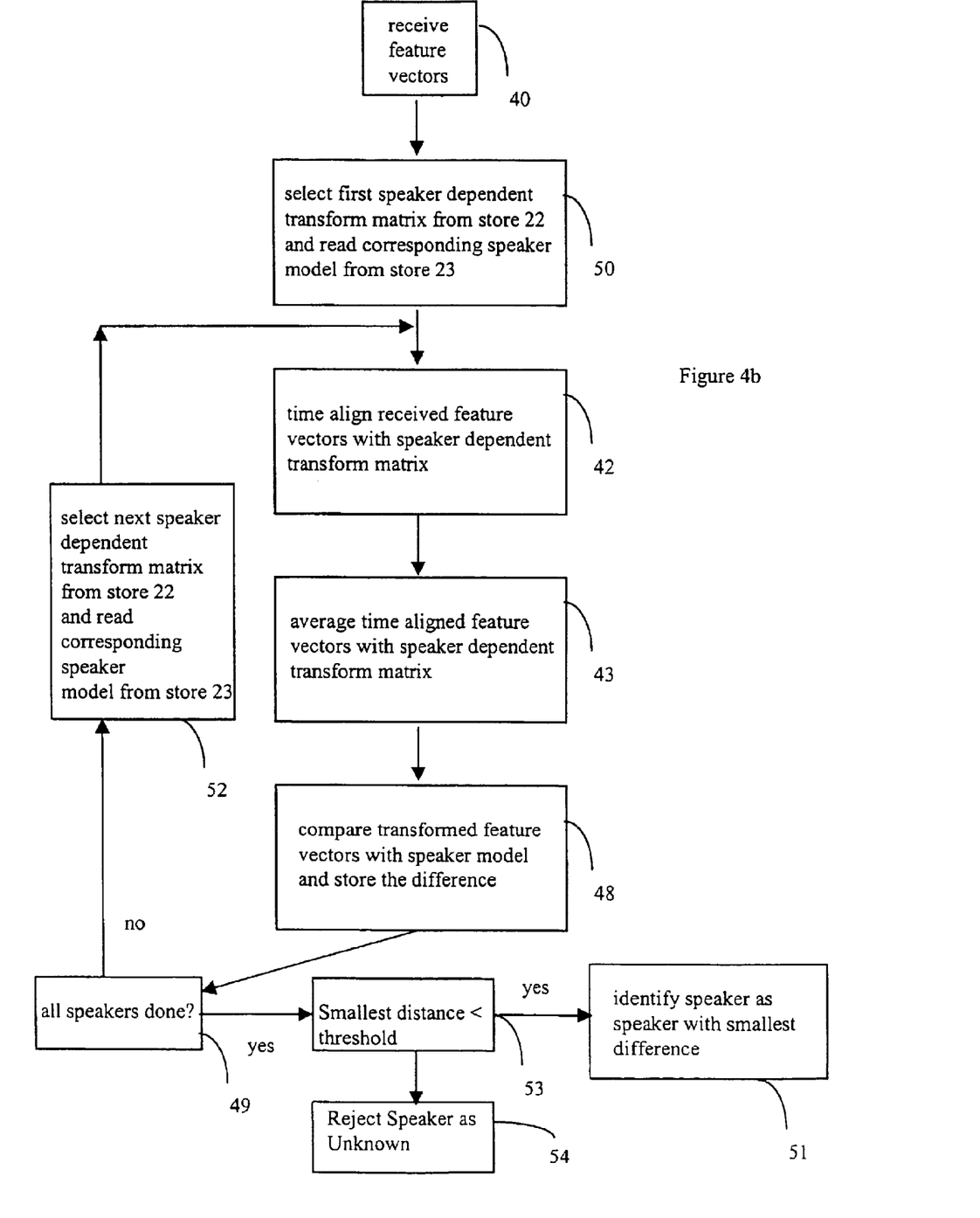
FIG. 4b is a flow diagram showing the operation of the recognition processor of FIG. 1 during speaker identification.

FIG. 4b shows the corresponding operation of the speaker recognition processor 21 in speaker identification; in this case, a plurality of speaker transforms and corresponding speaker models are used. Each speaker dependent transform is selected in turn and is used to time align received feature vectors at step 42. The time aligned sequence of received feature vectors is then compared with the corresponding speaker model at step 48. As described earlier with reference to FIG. 4a, each of the time aligned received feature vectors may also be averaged with the corresponding feature vector of the speaker dependent transform matrix at the optional step 43. The speaker is then identified as the known speaker with the distance measure indicating the greatest likelihood that the known speaker corresponds to the unknown speaker. However, if the smallest distance measure is greater than a threshold at step 53, indicating that none of the speakers have a particularly high likelihood of being the unknown speaker then the speaker is rejected at step 54 as being unknown to the system.

Historically, a DTW comparison process has worked better for speaker recognition than a HMM comparison process. One difference between comparing a sequence of feature vectors with a Hidden Markov Model and comparing the same sequence of feature vectors with a representative template using a Dynamic Time Warp algorithm is in the pattern matching stage. In a DTW approach one received feature vector may be matched to two or more representative feature vectors, corresponding to a horizontal path in FIG. 5. However, in a HMM approach each received feature vector may only be matched to one state. It is not possible to have a horizontal path in FIG. 11. Aligning the sequence of received feature vectors with the speaker dependent transform matrix allows more possibilities for mapping received feature vectors to HMM states, and hence can improve the performance of an HMM based speaker recogniser.

Another difference between an HMM based speaker recogniser and a DTW based speaker recogniser is that DTW templates are based entirely on one individual's speech whereas a single HMM topology is often defined prior to training a set of models with an individual's speech. In an improved embodiment of the invention the speaker models are provided by HMM's which have differing numbers of states depending upon each individual's training speech. For example, the minimum number of feature vectors in a set. of a particular individual's training utterances for a particular word may be used to select the number of states used for the HMM for that particular word for the particular individual. The number of features in the speaker dependent transform matrix may be similarly defined, in which case the number of features in the sequence of representative feature vectors will be the same as the number of states in the Hidden Markov Model.

The invention has been described with reference to MFCC's, but it will be appreciated that any suitable spectral representation may be used. For example, Linear Prediction Coefficient (LPC) cepstral coefficients, Fast Fourier Transform (FFT) cepstral coefficients Line Spectral Pair (LSP) coefficients etc.

Whilst a comparison process using the Hidden Markov Models has been discussed, the invention is equally applicable to speaker recognition employing other types of comparison process, for example, dynamic time warp techniques or neural network techniques.

The present invention employs a speaker dependent transform for the or each speaker to be identified. In the embodiment of the invention described here speaker dependent transform matrices are provided by means of a representative sequence of feature vectors for each word.

Methods of deriving representative sequences of feature vectors are well known, and for understanding the present invention it is sufficient to indicate that each representative sequence of feature vectors may be formed by a process of receiving a plurality of utterances of the same word by a speaker and deriving a set of feature vectors as described above for each of the utterances. The sequences are then time aligned, as described previously, for example, and then the time aligned sequences of feature vectors for the plurality of utterances are averaged to derive an averaged sequence of feature vectors which provides the speaker dependent transform matrix.

What is claimed is:

1. A method of speaker recognition comprising the steps of receiving a speech signal from an unknown speaker;
    transforming the received speech signal according to a transform, the transform being associated with a particular speaker;
    comparing the transformed speech signal with a model representing said particular speaker; and
    providing as an output a parameter which depends upon the likelihood that the unknown speaker is said particular speaker;
    wherein the transforming step is further arranged such that a received speech signal which has dissimilar characteristics to those of the particular speaker is more distorted by the transform, whereas a received speech signal which has similar or identical characteristics to those of the particular speaker will be less distorted by the transform.

2. A method according to claim 1, in which the transforming step comprises the substeps of
    detecting a speech start point and a speech end point within the received speech signal;
    generating a sequence of feature vectors derived from the received speech signal; and
    aligning the sequence of feature vectors corresponding to the speech signal between the detected start point and the detected end point with a representative sequence of feature vectors for said particular speaker such that each feature vector in the aligned sequence of feature vectors corresponds to a feature vector in the representative sequence of feature vectors.

3. A method according to claim 2, in which the transforming step further comprises the substep of averaging each feature vector in the aligned sequence of feature vectors with the corresponding feature vector in the representative sequence of feature vectors.

4. A method according to claim 2 in which the model is a left to right Hidden Markov Model and in which the representative sequence of feature vectors comprises the same number of feature vectors as the number of states in the Hidden Markov Model.

5. A method according to claim 1 in which the model is a Hidden Markov Model.

6. A method according to claim 5, in which the model is a left to right Hidden Markov Model.

7. An apparatus for speaker recognition comprising
    receiving means for receiving a speech signal from an unknown speaker;
    a speaker transform store for storing a plurality of speaker transforms each transform being associated with a respective one of a plurality of speakers;
    a speaker model store for storing a plurality of speaker models each speaker model being associated with a respective one of said plurality of speakers;
    transforming means coupled to the receiving means and the speaker transform store, and arranged in operation to transform the received speech signal according to a selected speaker transform;
    comparing means coupled to the transforming means and the speaker model store, and arranged in operation to compare the transformed speech signal with the corresponding speaker model; and
    output means for providing a signal indicative of the likelihood that the unknown speaker is the speaker associated with the selected speaker transform;
    wherein each transform is further arranged such that a received speech signal which has dissimilar characteristics to those of the respective speaker to which a transform relates is more distorted by the transform, whereas a received speech signal which has similar or identical characteristics to those of the respective speaker will be less distorted by the transform.

8. An apparatus according to claim 7, in which the transform store stores each of said transforms as a representative sequence of feature vectors;
    and in which the transforming means comprises
    a start point and end point detector for detecting a speech start point and a speech end point within the received speech signal,
    a feature vector generator for generating a sequence of feature vectors derived 35 from the input speech, and
    aligning means for aligning the sequence of feature vectors corresponding to the speech signal between the detected start point and the detected end point with a representative sequence of feature vectors such that each feature vector in the resulting aligned sequence of feature vectors corresponds to a feature vector in the representative sequence of feature vectors.

9. An apparatus according to claim 8, in which the transforming means further comprises averaging means for averaging each feature vector in the aligned sequence of feature vectors with the corresponding feature vector in the representative sequence of feature vectors.

10. An apparatus according to claim 8 in which the speaker model store is arranged to store the speaker model in the form of a left to right Hidden Markov Model. and in which the stored representative sequence of feature vectors comprises the same number of vectors as the number of states in the corresponding stored Hidden Markov Model.

11. An apparatus according to claim 7, in which the speaker model store is arranged to store the speaker model in the form of a Hidden Markov Model.

12. An apparatus according to claim 11 in which the speaker model store is arranged to store the speaker model in the form of a left to right Hidden Markov Model.

13. A method of speaker recognition comprising the steps of receiving a speech signal from an unknown speaker;

transforming the received speech signal according to a transform, the transform being associated with a particular speaker;

comparing the transformed speech signal with a model representing said particular speaker; and providing as an output a parameter which depends upon the likelihood that the unknown speaker is said particular speaker;

the method being characterised in that the transforming step comprises the substeps of:

detecting a speech start point and a speech end point within the received speech signal;

generating a sequence of feature vectors derived from the received speech signal; and aligning the sequence of feature vectors corresponding to the speech signal between the detected start point and the detected end point with a representative sequence of feature vectors for said particular speaker such that each feature vector in the aligned sequence of feature vectors corresponds to a feature vector in the representative sequence of feature vectors;

the aligning step further comprising the sub-step of, where a plurality of feature vectors in the aligned sequence of feature vectors correspond to a particular same feature vector in the representative sequence of feature vectors, selecting one of or an average of the plurality of feature vectors in the aligned sequence of feature vectors to correspond to the particular feature vector in the representative sequence of feature vectors.

14. A method according to claim 13, in which the transforming step further comprises the substep of averaging each feature vector in the aligned sequence of feature vectors with the corresponding feature vector in the representative sequence of feature vectors.

15. A method according to claim 13, in which the model is a Hidden Markov Model.

16. A method according to claim 15, in which the model is a left to right Hidden Markov Model.

17. A method according to claim 13, in which the model is a left to right Hidden Markov Model and in which the representative sequence of feature vectors comprises the same number of feature vectors as the number of states in the Hidden Markov Model.

18. An apparatus for speaker recognition comprising receiving means for receiving a speech signal from an unknown speaker; a speaker transform store for storing a plurality of speaker transforms each transform being associated with a respective one of a plurality of speakers;

a speaker model store for storing a plurality of speaker models each speaker model being associated with a respective one of said plurality of speakers;

transforming means coupled to the receiving means and the speaker transform store, and arranged in operation to transform the received speech signal according to a selected speaker transform;

comparing means coupled to the transforming means and the speaker model store, and arranged in operation to compare the transformed speech signal with the corresponding speaker model; and output means for providing a signal indicative of the likelihood that the unknown speaker is the speaker associated with the selected speaker transform;

wherein the transform store stores each of said transforms as a representative sequence of feature vectors;

and the transforming means comprises a start point and end point detector for detecting a speech start point and a speech end point within the received speech signal, a feature vector generator for generating a sequence of feature vectors derived from the input speech, and aligning means for aligning the sequence of feature vectors corresponding to the speech signal between the detected start point and the detected end point with a representative sequence of feature vectors such that each feature vector in the resulting aligned sequence of feature vectors corresponds to a feature vector in the representative sequence of feature vectors;

wherein the aligning means further comprise feature vector selecting means for, where a plurality of feature vectors in the aligned sequence of feature vectors correspond to a particular same feature vector in the representative sequence of feature vectors, selecting one of or an average of the plurality of feature vectors in the aligned sequence of feature vectors to correspond to the particular feature vector in the representative sequence of feature vectors.

19. An apparatus according to claim 18, in which the transforming means further comprises averaging means for averaging each feature vector in the aligned sequence of feature vectors with the corresponding feature vector in the representative sequence of feature vectors.

20. An apparatus according to claim 18, in which the speaker model store is arranged to store the speaker model in the form of a Hidden Markov Model.

21. An apparatus according to claim 20 in which the speaker model store is arranged to store the speaker model in the form of a left to right Hidden Markov Model.

22. An apparatus according to claim 18, in which the speaker model store is arranged to store the speaker model in the form of a left to right Hidden Markov Model, and in which the stored representative sequence of feature vectors comprises the same number of vectors as the number of states in the corresponding stored Hidden Markov Model.

* * * * *